Figure 1:
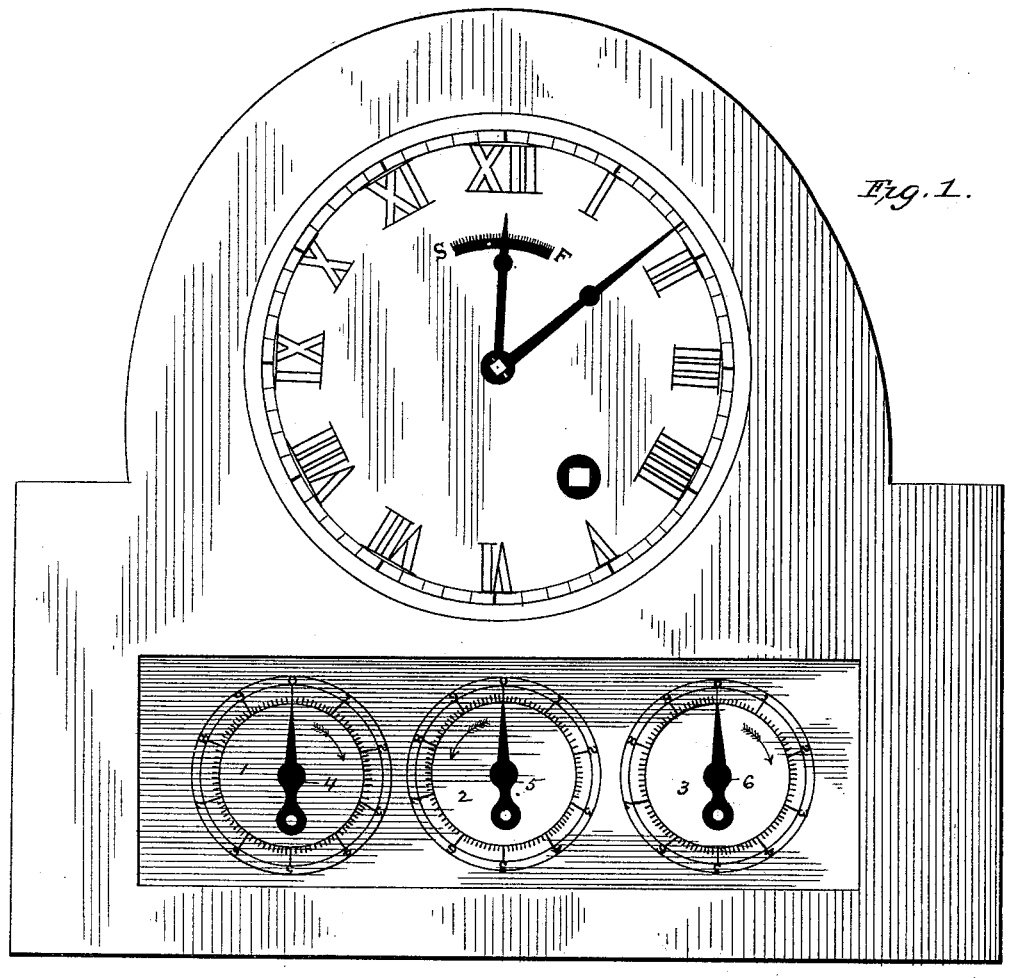

(No Model.)

3 Sheets—Sheet 1.

P. S. BATES.
ELECTRIC METER.

No. 415,491. Patented Nov. 19, 1889.

WITNESSES
Edwin L. Yewell.
Jos. A. Ryan

INVENTOR
Peter Silvanus Bates
by Robt. H. Read,
his Attorney

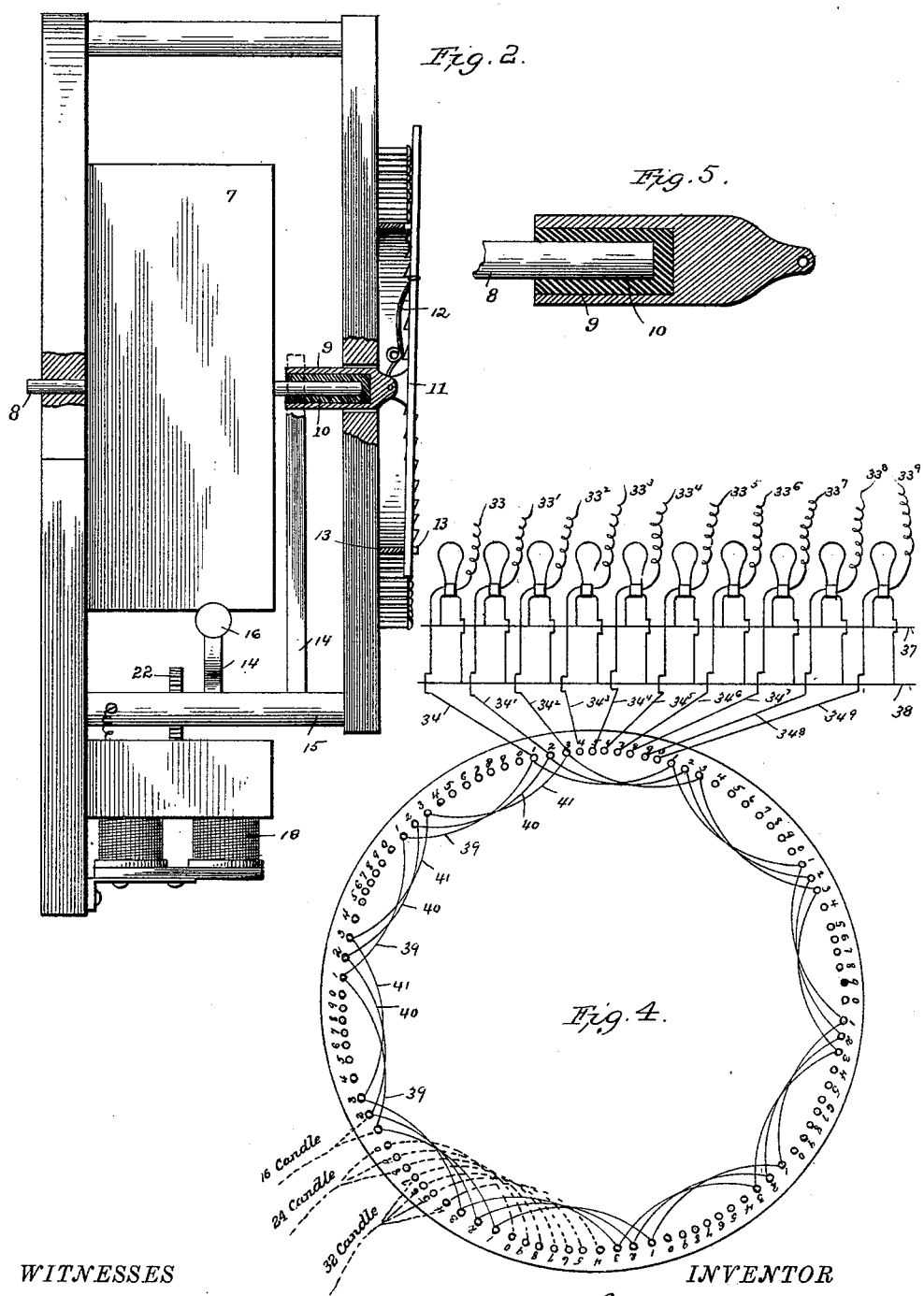

(No Model.) 3 Sheets—Sheet 3.

P. S. BATES.
ELECTRIC METER.

No. 415,491. Patented Nov. 19, 1889.

WITNESSES
Edwin L. Yewell.
Jos. A. Ryan

INVENTOR
Peter Silvanus Bates
by Ross H. Rear
his Attorney

UNITED STATES PATENT OFFICE.

PETER SILVANUS BATES, OF YORK, PENNSYLVANIA.

ELECTRIC METER.

SPECIFICATION forming part of Letters Patent No. 415,491, dated November 19, 1889.

Application filed January 6, 1888. Serial No. 259,934. (No model.)

*To all whom it may concern:*

Be it known that I, PETER SILVANUS BATES, a citizen of the United States, residing at York, in the county of York and State of Pennsylvania, have invented certain new and useful Improvements in Electric Meters; and I do declare the following to be a full, clear, and exact description of the invention, such as will enable others skilled in the art to which it appertains to make and use the same, reference being had to the accompanying drawings, and to the figures of reference marked thereon, which form a part of this specification.

In electric meters as heretofore constructed the registration or indication of the meter is effected by the strength of the current, conjoined with the time during which current is being used in the consumption-circuit, or is solely dependent on the time where the strength of current on line is a practically-constant quantity, and where the resistance of the translating device is a known and substantially invariable quantity.

My invention relates to the latter class, the meter being placed in shunt relation to the translating device and so arranged with reference thereto that the shunt will be out of circuit when the circuit through the translating device is ruptured.

It is the object of my invention to produce a device of this character which may be readily placed in any system of electric distribution and may readily be adjusted to give an accurate indication of the amount of current consumed in the plant where it is located, although said plant may contain a considerable number of translating devices of different resistances—as, for example, where a number of electric lamps are used in a single building or a number of adjacent buildings controlled by the same consumer—and where the lamps may be of various illuminating-powers—as eight candles, sixteen candles, twenty-four candles, &c.—it is desirable to have a meter which will accurately indicate the total amount of current consumed in this plant, although different lamps may be burning for different lengths of time and during certain variable intervals none may be burning.

To this end my invention consists in providing a series of contacts, one or more for each translating device, depending on its consumption of current, and in placing in operative relation thereto a shifting circuit-closer controlled by clock-work or other mechanism, which will traverse the contacts in a definite interval of time, and actuated by an electrically-controlled indicator which will be set to a new indication for each closure of the circuit.

My invention also embodies certain features of construction and details which will hereinafter be clearly set forth in this specification, and then definitely indicated in the claims.

Figure 7:
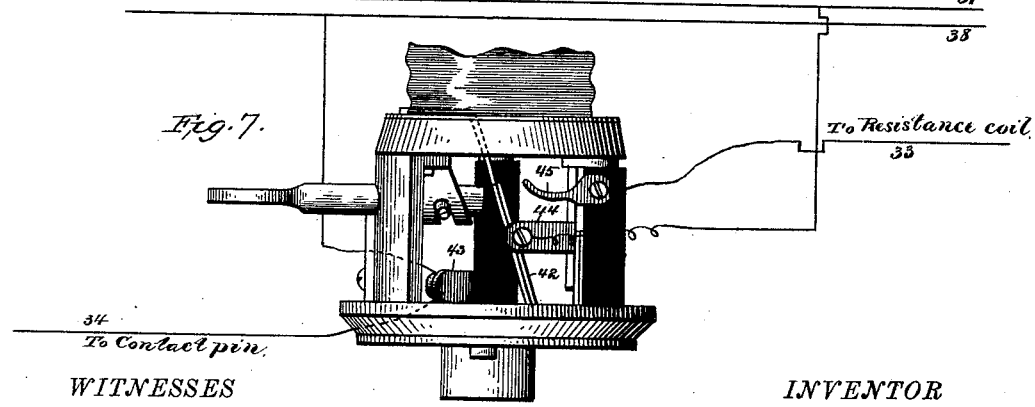
Figure 3:
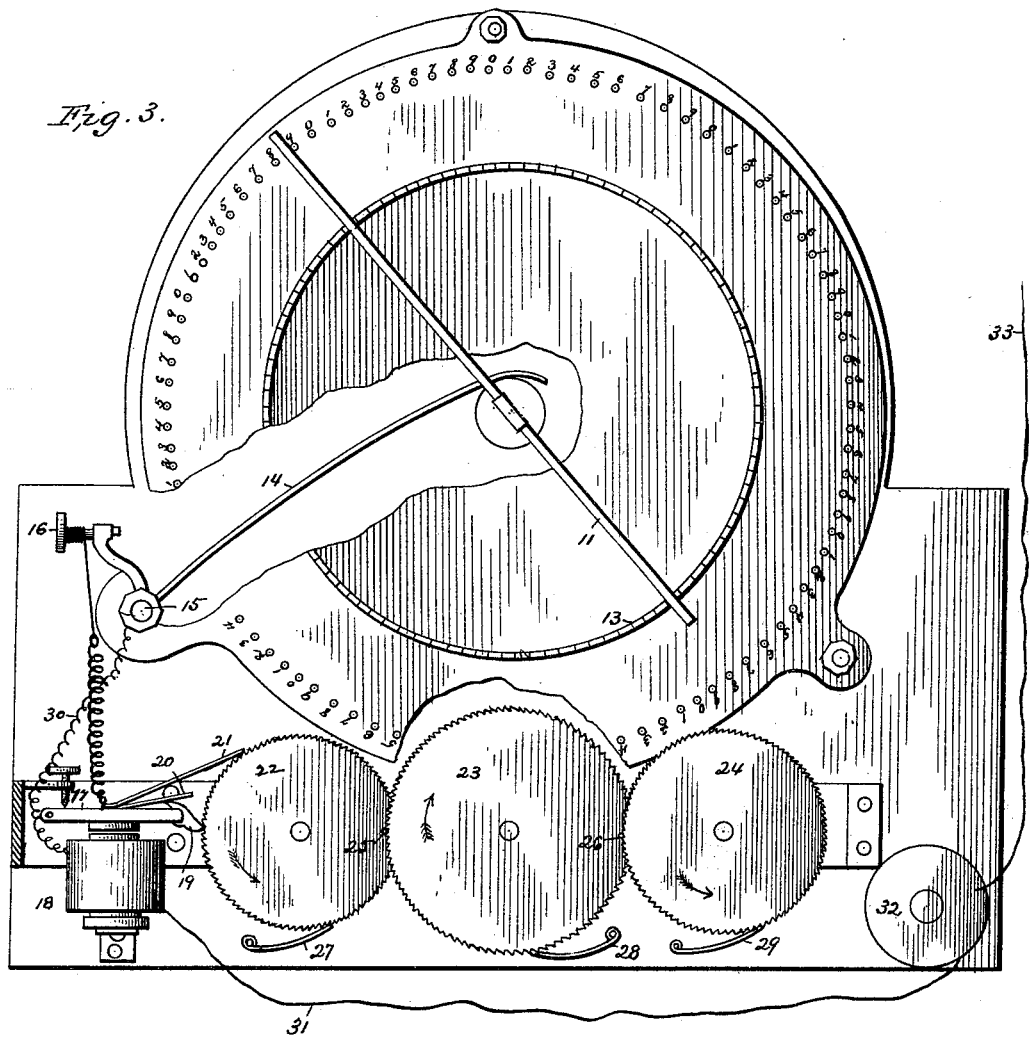
Figure 6:
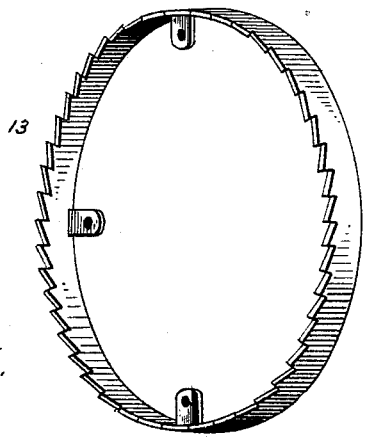

In the accompanying drawings, which illustrate my invention, Figure 1 is a front elevation of my electric meter. Fig. 2 is a side elevation thereof, the peripheral casing being removed. Fig. 3 is a rear elevation with parts broken away to better illustrate the mode of operation of the meter. Fig. 4 is a diagrammatic view showing the connections of the several contacts and their relation to the translating devices. Fig. 5 is a detail showing the manner of mounting the support for the traveling circuit-closer on the clock-shaft. Fig. 6 is a perspective detached view of a ring by which the circuit-closer is forced into and out of engagement with the contacts when it is carried into operative relation to the same by the clock-work. Fig. 7 is a detail showing the connections of a translating device, in this instance an incandescent lamp, with the main circuit and the conductors which connect with the meter, the socket-casing being removed.

The translating device illustrated in the drawings, is shown as an incandescent lamp, as the meter will find its largest field of use in connection with electric-lighting circuits.

It is to be understood, however, that said lamps might readily be replaced by electric motors, arc lamps, or any other translating devices of a practically uniform amount of electric consumption, the central idea of my invention being that each contact represents a consuming device which uses substantially equal quantities of electricity in equal times, and the several consuming devices using the same or a multiple of the same quantity of electricity in the same interval of time, as will be hereinafter fully described.

A clock-movement 7, Fig. 2, provided with indicating dial and hands, as shown in Fig. 1, is mounted in a suitable casing. On the same side of this casing as the clock-dial are several registering-dials 1 2 3, provided with indicators 4 5 6, and indicating-numbers, the relative arrangement of which will presently appear. On a shaft of the clock-movement, preferably the hour-shaft 8, is frictionally secured a support 9, insulating material 10 being interposed between the two. A rod 11 is pivoted to this support, one end of said rod being held in engagement with a serrated ring 13, Figs. 2, 3, and 6, by a spring 12. The ring is mounted on a suitable support on the back of the casing, and is inclosed by a circular series of contact-pins 1 2 3 4 5 6 7 8 9 10, arranged in groups, as shown in Fig. 3. One end of the rod extends radially beyond the series of pins, and the other end extends just beyond the serrated ring. The serrations of the ring are of such a height that when one end of the rod rides up on any one of them the other end will be forced down upon a pin, the topmost part of each tooth of the ring being in the same radial plane with one of the contact-pins. It will therefore be evident that when, as the end of the rod travels circumferentially, the shorter end rises on a tooth the other end will descend and make contact with the head of a pin, and that when the shorter end of the rod leaves the highest part of a tooth the spring 12 will bring it rapidly down into a depression and suddenly rupture the circuit at the pin without endangering contact with another pin, and will raise it out of the plane of the pins, so that any trembling of the rods will not endanger the accuracy of registration by causing false contacts. A further incident of this structure, which I regard as an important feature, is that the end of the rod is thrown a considerable distance outward from the pin by a sudden movement, thus preventing the formation of an arc and its deleterious effects on the contacts, and preventing heating of the parts and consequent damage to the instrument.

As shown in the drawings, the contact-pins are arranged in groups of ten to correspond to a plant in which ten lamps are used, and ten of these groups are shown, thus making a hundred contact-pins. With this arrangement each pin is brought into circuit ten times during one revolution of the circuit-closing rod 11, so that each lamp will cause the registering-indicator on one of the dials to move once every six minutes. This, of course, is a mere arbitrary selection, as any number of pins may be used and any number of lamps, the only requisite being that successive revolutions of the circuit-closing arm shall be made in equal periods of time, and that there shall at least be one pin for each lamp.

Bearing on the metallic sleeve 10 is a contact-brush 14, secured to a metallic post 15, fixed to the frame-work. This post is in electric connection with an electro-magnet 18 by a conductor 30, and the magnet in turn with a resistance-coil 32 by conductor 30. As the instrument illustrated is intended for use in shunts around the lamps, this resistance-coil interposes the same number of ohms in the shunt-circuit as the lamp does in the derivation from the main conductors. A supporting-arm mounted on post 15 carries an adjusting-drum 16 to graduate the retractile tendency on the armature 17 of the electro-magnet. This armature is provided with a pawl 19, which yields on its back travel under stress of the spring 20. The pawl actuates on each forward stroke a toothed wheel 22, shifting it in the direction of the arrow, Fig. 3, a space of one tooth each time the electro-magnet is energized. A check-pawl, which may be simply a spring 21, bearing on the wheel, prevents the latter from moving more than the desired distance when suddenly actuated. Wheel 22 carries a pin 25 near its circumference, which advances another toothed wheel 23 one tooth each time wheel 22 makes a complete revolution. Wheel 23 in like manner co-operates with wheel 24 by means of a pin 26. Check-springs 27 28 29 prevent the wheels moving more than the distance they are positively thrust. The indicators 4 5 6, Fig. 1, are secured to the axes of the respective wheels 24 23 22.

The lamps are shown in parallel arc between the main conductors 37 38. In the socket of each lamp, where its connections with the main circuit are made, are secured conductors 33 34, leading to the meter, so that when the key is turned so as to rupture the main-circuit the meter-shunt is also broken. One set of these shunt-wires proceeds from the respective lamps to different consecutive contact-pins, as clearly shown in Fig. 4. The other shunt-wires connect with a common conductor 33, leading to the resistance-coil 32, Fig. 3. The respective pins of the several groups are electrically connected in any convenient manner, as shown, so that all of the 1 pins are in electric communication with each other, all of the 2 pins likewise, and so on. This reduces the number of connections with the shunt conductor, since, obviously, if each pin of any one group is in the shunt-circuit of its corresponding lamp, all the other corresponding pins in the other groups will be likewise in the same circuit.

The arrangement described is to be adopted wherever all of the consuming-lamps are of the same candle-power. Suppose, however, there are in the same plant lamps of greater candle-power, as 16 or 32. In order to make the meter register the increased amount of current consumed by these lamps of higher candle-power, I adopt the following arrangement:

The apparatus herein described is adapted only for lamps the candle-powers of which are graduated in even multiples, as eight, sixteen, twenty-four, thirty-two; and as the lamps in use are so graduated no difficulty will arise from a provision countenancing this system of graduation. As a sixteen-candle lamp consumes twice as much current as an eight-candle lamp it should register twice as often in the same time; so a twenty-four-candle lamp should register three times as often, and so on. In order to accommodate the meter to this requirement, I connect the shunt-wire of the sixteen-candle lamp with two pins, the twenty-four-candle lamp with three pins, and the thirty-two-candle lamp with four pins, as indicated in dotted lines in the lower part of Fig. 4. As the circuit-closing rod moves over the contact-pins each sixteen-candle lamp will therefore register two indications on the dial to one for an eight-candle lamp; and so those of a higher power will register as many indications as they are multiples of the lowest candle-power lamp; so that at any time of observation at the end of an hour, or when the circuit-closer arrives at the end of a group of pins, the registration on the dial will give an accurate index of the total amount of current used in the plant. The indications really indicate the time a single lamp of eight-candle power has been burning, but as the number of coulombs passing through such a lamp in a unit of time is known for any given constant current strength the absolute amount of electricity used may be directly determined.

I have described the circuit-closing arm as attached to the hour-shaft of the mechanical motor; it is obvious, however, that it might be attached to a shaft moving more rapidly or more slowly, as may be found desirable.

As a hundred contact-pins are shown in the drawings, wheel 24 will be actuated one hundred times during each revolution of the circuit-closing rod, and if this wheel is provided with a hundred teeth it will make one revolution for each hour that all the lamps are burning. So wheel 23 will move one tooth every hour, or one revolution every hundred hours, and wheel 22 will move one tooth every hundred hours or one revolution every ten thousand hours. If more lamps or larger lamps were in circuit, the number of pins would be increased, so that the index-finger 6 would make one-tenth of a turn for every hour that an eight-candle lamp may be burning. By dividing the scale of dials 1 2 3 into one hundred equal parts, therefore, the whole reading will indicate the total time of consumption for an eight-candle lamp. Thus suppose at the time a reading is taken index 6 points at 20, index 5 points at 6, index 4 points at 2, the consumption is represented by 20,000, 600+2 equals twenty thousand six hundred and two hours. If now a current of twenty ampères is flowing on line and the resistance of a lamp is one hundred ohms, twenty one-hundredths or one-fifth of a coulomb is consumed every second, and in one hour, if the lamp be continuously burning, sixty multiplied by sixty fifths or seven hundred and twenty coulombs of electricity is consumed. Now as the meter only indicates the actual time the lamps are burning the registration need only be multiplied by sixty multiplied by twelve to obtain the exact amount of current used. The path of the current may be traced as follows: Proceeding from the side 38 of the main conductors it passes to the lamp, and through the latter when it is turned onto the other main. The meter-shunt is now closed and a derived current will flow over conductor 34 34' 34², &c., accordingly as the corresponding lamps are in or out of circuit to their pins, thence periodically through rods 11, sleeve 9, brush 14, post 15, conductor 30, magnet 18, conductor 31, resistance-coil 32, conductor 33 to lamp. When the shunt-circuit is closed by the rod, the wheel 22 is actuated and the registration begins, continuing at definite periods as long as a lamp or lamps are burning.

It will of course be understood that the clock is not an absolutely necessary part of the apparatus, as any mechanical motor one of the shafts of which has a continuous uniform rate of movement will subserve the use of the meter. It is convenient, however, to have the clock and its dial present, so that the meter may be placed in a room and used as a combined current-register and timepiece; also that the meter-motor is more certain to be kept wound and in working order.

The mechanism will of course be so inclosed as to prevent tampering with the parts by unscrupulous or unauthorized parties.

In connecting the meter-circuit with the lamp any simple form of connection may be adopted, that shown in Fig. 7 answering well. The lamp-socket here shown is of a common type used in Edison plants. These sockets are provided with a contact-spring 42, which is forced forward when the key is turned in one direction, so as to bring its upper end into engagement with one of the leading-in wires to the filament. The other leading-in wire connects through the socket with a metallic piece 43. Spring 42 is supported by a metallic piece 44. Both pieces 43 and 44 are mounted on posts of insulating material. On the insulating-post may be mounted a metallic finger 45, so that when the key forces spring 42 to the right it will contact with the finger. One terminal of the meter-shunt should be secured to this finger and the other to piece 43. With this arrangement of parts it will be seen that a make or break of the lamp will cause a corresponding change in the meter-circuit.

I desire that it also be understood that my invention is not restricted to an apparatus in which the contacts are stationary and the contacting arm or brush movable, as any arrangement of these parts by which relative movement is established will accomplish the same result.

Having thus described my invention, what I claim as new, and desire to secure by Letters Patent, is—

1. In an electric meter, the combination of a continuously-moving circuit-closer, a series of contacts engaged by the same, each contact corresponding to a translating device of a definite consuming capacity, and an electrically-controlled indicator in circuit with the circuit-closer.

2. In an electric meter, the combination of a continuously-moving circuit-closer, a series of contacts in the path of movement of said circuit-closer, a translating device, a supply-circuit, a circuit-controller for throwing said contacts into the supply-circuit when the translating device is operating, and an electrically-controlled indicator in circuit with the circuit-closer.

3. The combination of a translating device or translating devices of a practically uniform consuming capacity, a circuit-controller for each translating device, a meter-circuit controlled by said circuit-controller, a continuously-moving circuit-closer, a series of contacts in the path of movement of the circuit-closer, and an electrically-controlled indicator in circuit with the circuit-closer, as and for the purpose set forth.

4. The combination of a supply-circuit, translating devices in said circuit, a circuit-controller for each translating device, a shunt around each translating device controlled by the circuit-controller, a series of contacts, one or more for each translating device in the shunt-circuit, a continuously-moving circuit-closer, an electrically-controlled indicator, and a resistance-coil, all in the shunt-circuit, as and for the purpose set forth.

5. In an electric meter, the combination of an electric circuit, a series of contacts, each contact representing a translating device of a definite degree of electric consumption, one or more contacts corresponding to each translating device, according to its degree of consumption, a circuit-closer periodically engaging said contacts, and an electrically-controlled indicator controlled by said circuit-closer.

6. In an electric meter, the combination of a circular series of contacts, each contact representing a translating device of a definite degree of electric consumption, said contacts being arranged in consecutive groups, and the corresponding contacts of the several groups being provided with a common connection, a circuit-closing arm moving over said contacts and periodically engaging the same, and an electrically-controlled indicator in circuit with the circuit-closer.

7. The combination of a series of contacts, a circuit-closing arm moving over said contacts, said arm being adapted to be raised from the contacts, a serrated guide on which said arm bears, a spring for holding the arm in engagement with the guide, the serrations of the guide being of such proportion and relative arrangement to the contacts that when the arm reaches a contact it will be alternately pressed into engagement therewith and then suddenly raised therefrom, as and for the purpose set forth.

8. In an electric meter, the combination of a clock-movement 7, a circuit-closer 11, mounted on a spindle of said movement, but insulated therefrom, a series of contacts in the path of said circuit-closer, serrated ring 13 in operative relation to the circuit-closer, brush 14, electro-magnet 18, resistance-coil 32, co-operating indicator-wheels 22 23 24, means for actuating them by the electro-magnet, and circuit-connections whereby, when a translating device to be measured is in use, current will be periodically thrown through the electro-magnet, as and for the purpose set forth.

9. The combination of a lamp-circuit, a meter in a shunt-circuit around the lamp, and circuit-connections controlled by the key of the lamp for closing both circuits simultaneously.

10. The combination of the lamp-circuit, the meter-circuit in a shunt, and circuit-connections within the socket of the lamp for simultaneously controlling both circuits.

11. The combination of a lamp-circuit, a meter-circuit in a shunt around the lamp, a key for simultaneously controlling both circuits, and a resistance-coil in the meter-circuit to prevent short-circuiting the lamp.

12. The combination of a translating device, a registering-circuit to indicate the consumption of current by said translating device, a periodic circuit-closer controlling the registering-circuit, and guide for producing a sudden rupture of the circuit-closer when leaving a contact.

13. In an electric meter, the combination of a register, an electro-magnet for operating the same, a continuously-operated circuit-changer for periodically closing the magnet-circuit, and circuit-connections, whereby the magnet-circuit is supplied with current when a lamp is turned on.

14. In an electric meter, the combination of a translating device or translating devices, a registering-circuit for each translating device, a continuously-operated circuit-changer for periodically changing the registering-circuit, and a circuit-closer for simultaneously throwing current through the translating device and the registering-circuit.

15. In an electric meter, the combination of one or more lamp-circuits, a registering-circuit for each lamp, a continuously-rotating circuit-closer for the registering-circuits, contacts periodically made by said circuit-closer, an electro-magnetic register controlled by the circuit-closer, a key on each lamp, and circuit-connections with the key, whereby both the lamp-circuit and the registering-circuit are simultaneously closed.

16. In an electric meter, the combination of one or more lamp-circuits, a registering-circuit for each lamp, a key on each lamp for controlling the registering-circuits, a continuously-rotating circuit-closer for the registering-circuits, an actuating-motor for said circuit-closer, a series of contacts periodically engaged by the circuit-closer, a registering-indicator, and an electro-magnetic device for operating the indicator when the lamps are burning.

17. In an electric meter, the combination of a lamp or series of lamps, a register for indicating their electric consumption, means for actuating said register, a controlling-circuit for rendering it operative, and a lamp-key for simultaneously closing the lamp-circuit and the controlling-circuit.

In testimony whereof I affix my signature in presence of two witnesses.

PETER SILVANUS BATES.

Witnesses:
W. H. SITLER,
EDWARD WITMER.